United States Patent
Tezza, II et al.

(10) Patent No.: US 12,138,993 B2
(45) Date of Patent: Nov. 12, 2024

(54) VEHICLE OEM WINDOW WALL EXTENSION

(71) Applicants: Peter J. Tezza, II, Oxnard, CA (US); Jean-Thierry Aupetit, Oxnard, CA (US)

(72) Inventors: Peter J. Tezza, II, Oxnard, CA (US); Jean-Thierry Aupetit, Oxnard, CA (US)

(*) Notice: Subject to any disclaimer, the term of this patent is extended or adjusted under 35 U.S.C. 154(b) by 47 days.

(21) Appl. No.: 17/851,016

(22) Filed: Jun. 27, 2022

(65) Prior Publication Data

US 2022/0410668 A1 Dec. 29, 2022

Related U.S. Application Data

(60) Provisional application No. 63/215,522, filed on Jun. 28, 2021.

(51) Int. Cl.
*B60J 1/00* (2006.01)
*B60J 1/10* (2006.01)

(52) U.S. Cl.
CPC ........ *B60J 1/007* (2013.01); *B60J 1/10* (2013.01)

(58) Field of Classification Search
CPC .............. B60J 1/007; B60J 1/10; B60J 1/004
USPC ............................................. 296/201, 146.15
See application file for complete search history.

(56) References Cited

U.S. PATENT DOCUMENTS

| | | | | |
|---|---|---|---|---|
| 4,834,447 A * | 5/1989 | Higgins | ............... | B60J 1/10 52/208 |
| 4,991,349 A * | 2/1991 | Barthelemy | ........... | B60J 1/10 49/504 |
| 5,080,425 A * | 1/1992 | Austin | ............... | B60J 1/18 296/146.15 |
| D337,561 S * | 7/1993 | Austin | ............... | D12/183 |
| 5,263,757 A * | 11/1993 | Reed | ............... | B60R 9/00 296/24.43 |
| 6,378,931 B1 * | 4/2002 | Kolluri | ............... | B60J 10/70 52/204.63 |
| 6,474,713 B1 * | 11/2002 | Ruck | ............... | B60R 21/026 410/129 |
| 6,672,637 B2 * | 1/2004 | Hutzel | ............... | B62D 47/003 296/3 |
| 8,782,956 B2 * | 7/2014 | Giroux | ............... | B60J 1/007 49/504 |
| 10,392,032 B2 * | 8/2019 | Gastal | ............... | B61D 25/00 |
| 11,466,507 B2 * | 10/2022 | Eck | ............... | B60J 1/007 |
| 2014/0352224 A1 * | 12/2014 | Gascon | ............... | B60J 1/085 49/460 |

* cited by examiner

*Primary Examiner* — Jason S Morrow
(74) *Attorney, Agent, or Firm* — David Michie

(57) ABSTRACT

An Original Equipment Manufacturer (OEM) window extension for a vehicle, the OEM window extension comprising: an extension, wherein the extension uses as least one extension fastener; an OEM window; wherein the extension is installed on the vehicle; and wherein the OEM window is installed in the extension.

7 Claims, 4 Drawing Sheets

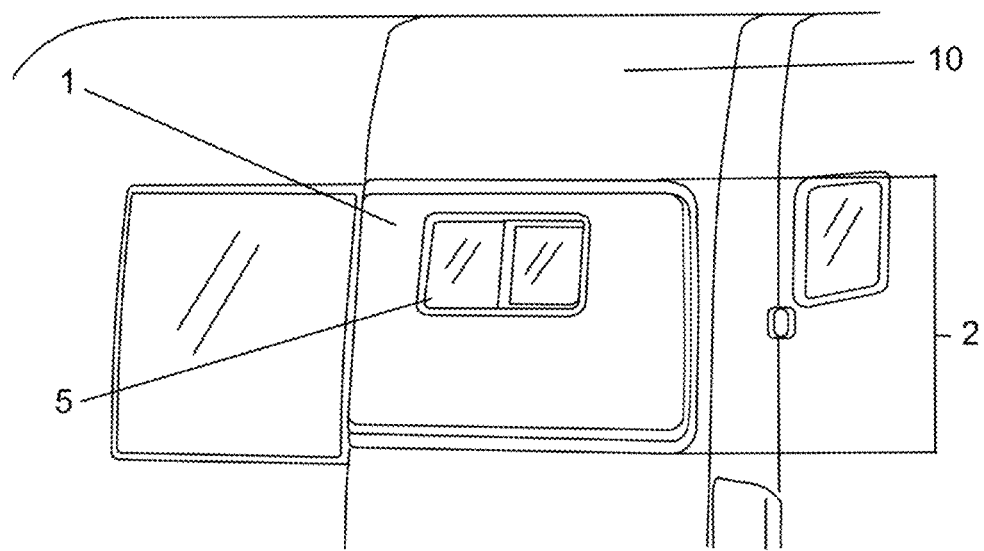
FIG. 1 – Prior Art
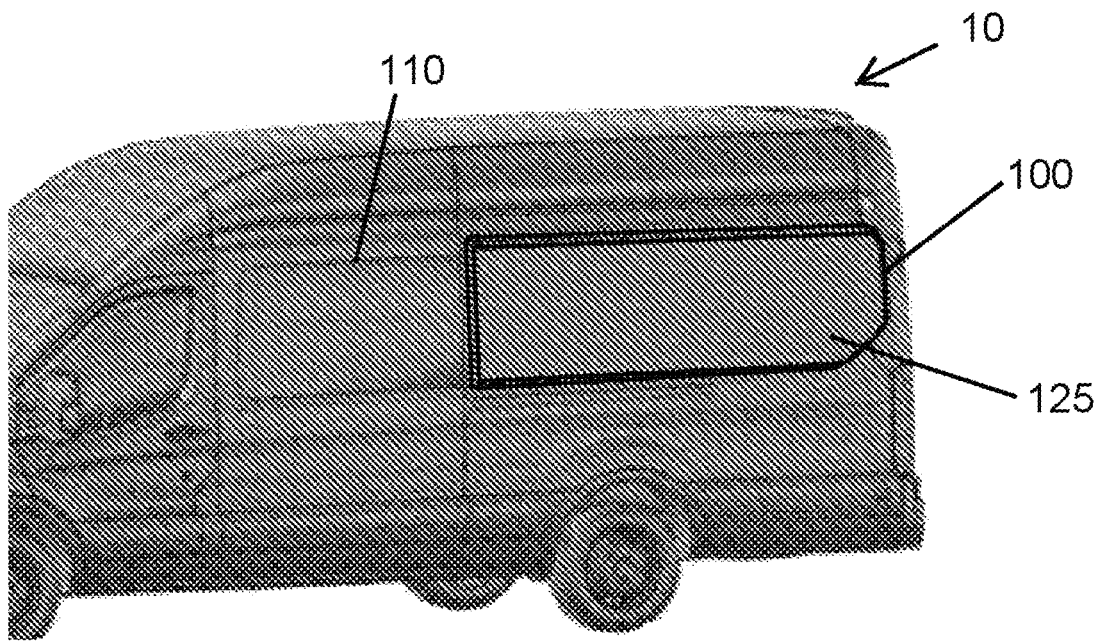
FIG. 2

VEHICLE OEM WINDOW WALL EXTENSION

CROSS-REFERENCE TO RELATED APPLICATIONS

This application is a non-provisional of, and claims the benefit of priority from, U.S. Provisional Patent Application No. 63/215,522 filed Jun. 28, 2021.

FEDERALLY SPONSORED REASEARCH

Not Applicable

FIELD OF INVENTION

This invention relates to a wall extension for a vehicle, more particularly, to a wall extension that uses Original Equipment Manufacturer (OEM) windows for vehicles such as vans, camper vans, and recreational vehicles (RVs).

BACKGROUND

Vehicle extensions, sometimes called "pop outs" or "flares," are used on vehicles such as vans, camper vans, and Recreational Vehicles (RVs), to increase the interior volume of a vehicle. These extensions do not require significant structural modifications to an Original Equipment Manufacturer (OEM) vehicle.

Existing vehicle extensions have the following characteristics: they are designed to fit inside the original window openings to ease installation and avoid vehicle structure modifications; they do not allow the installation of full-sized vehicle OEM windows because the window mount surface of the vehicle extension is smaller than the original vehicle window opening; and, because the window mounting surface area is smaller than the OEM window opening, the only alternatives for windows are to use smaller, generic windows or custom make full sized OEM windows.

There is a need for vehicle wall extensions that use OEM windows that provides an increase interior cubic volume in the vehicle that also allows for customization depending on a user's needs.

BRIEF SUMMARY OF THE INVENTION

A slide An Original Equipment Manufacturer (OEM) window extension for a vehicle, the OEM window extension comprising: a window opening in at least one of a body, a door, and a wall of the vehicle; an extension, wherein the extension uses as least one extension fastener; an OEM window; wherein the extension is installed on the vehicle; and wherein the OEM window is installed in the extension.

Wherein the extension has a flange protruding substantially around a perimeter of the extension; wherein the flange increases surface area of the extension that is affixed to the vehicle. Wherein the extension has a ridge protruding away from the vehicle.

Wherein the extension has a slope that varies the depth of extension. Wherein the slope begins from a front of the vehicle and extends away from the vehicle towards a rear of the vehicle, wherein the slope prevents damage as a result of drag forces

BRIEF DESCRIPTION OF THE DRAWINGS

FIG. 1 is a prior art photograph of a flare wall extension with a small non-OEM window.

FIG. 2 is an isometric example of an OEM window wall extension on a vehicle.

DETAILED DESCRIPTION OF THE INVENTION

Figure 3:
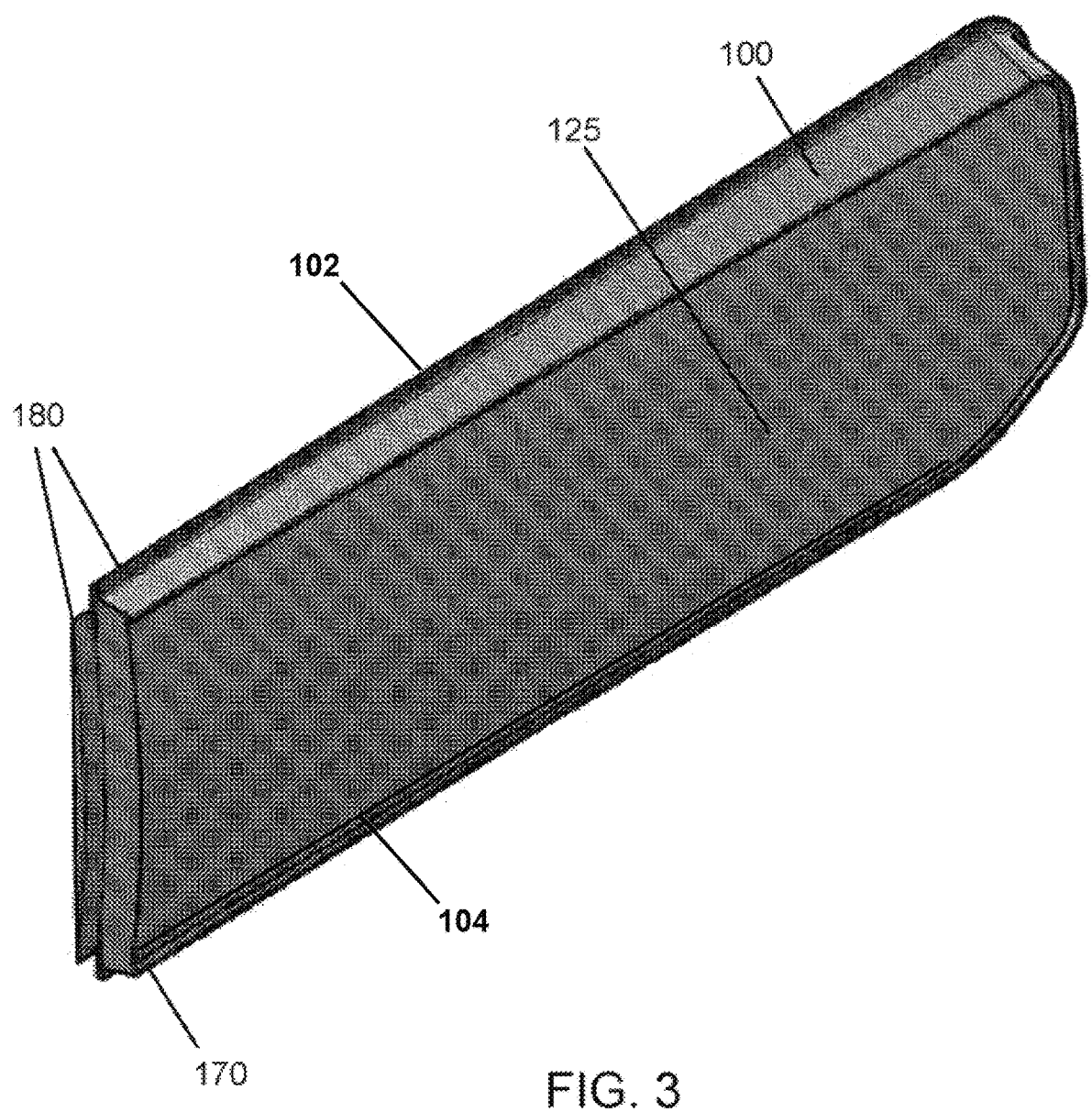
FIG. 3 is an isometric view of the OEM window wall extension.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

As seen in FIG. 1, a prior art extension or flare 1 protrudes from a window opening 2 of a vehicle 10. A non-OEM window 5 sits in the prior art extension 1. This non-OEM window 5 needs to be smaller than the window opening 2 of the vehicle 10, thus limiting the size of any window that could be used with the vehicle 10. A full-sized OEM window could not be used with the prior art extension 1.

Referring now to FIGS. 2 and 3 of the current invention, in most embodiments, an original equipment manufacturer (OEM) extension or flare 100 may be designed to be slightly larger that an original equipment manufacturer (OEM) vehicle window opening 110 in a vehicle 10. In most embodiments, a shape and size of the OEM extension 100 may be designed to allow mounting full-sized OEM windows 125 within the OEM extension 100.

In some embodiments, the OEM extension 100 may have a ridge 170 protruding from a face of the OEM extension 100. This ridge 170 may assist in preventing water or moisture from leaking between the full-sized OEM windows 125 and the OEM extension 100. The ridge 170 may also assist in reducing drag on the full-sized OEM windows 125 that have been extended from the vehicle 10. The ridge 170 may also be used to readily align the full-sized OEM windows 125 with the OEM extension 100 for do-it-yourself (DIY) users.

In most embodiments, the OEM extension 100 may have a flange protrusion 180 around part of the OEM extension 100 or around all of the OEM extension 100. The flange protrusion 180 may increase a surface area of contact between the OEM extension 100 and the vehicle 10, so as to increase grip strength between the OEM extension 100 and the vehicle 10 when using fasteners, such as adhesives or mechanical fasteners, such as screws, bolts and nuts, etc., permanent fasteners, such as rivets, welding, or a combination of permanent and non-permanent fasteners and/or adhesives.

Figure 4:
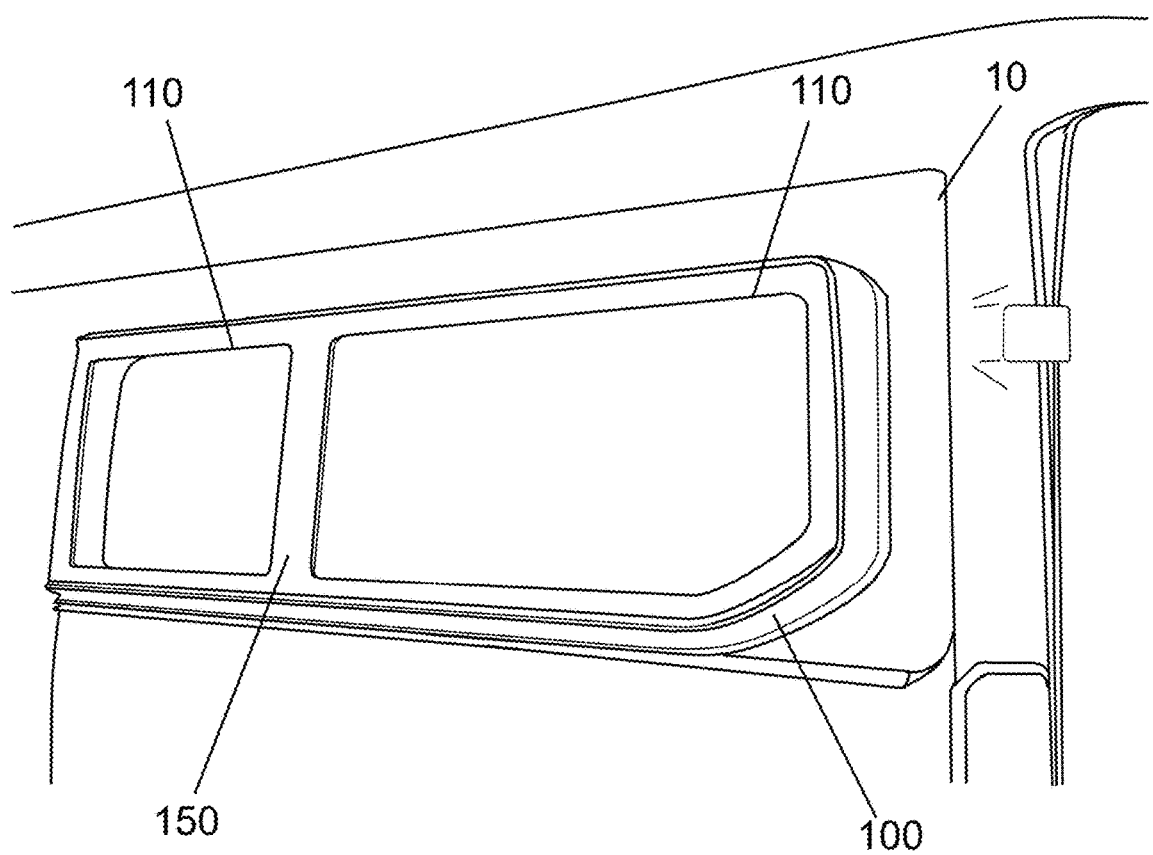
FIG. 4 is a perspective view of the OEM window wall extension without OEM windows.

In most embodiment, the OEM extension 100 may increase an interior space of the vehicle, thus preventing a user from feeling cramped while in the vehicle 10. In some embodiments, as seen in FIG. 4, the OEM extension 100 may encompass one or more full-sized OEM window openings 110. In this embodiment, the OEM extension 100 may have at least one cross support bar 150 so as to separate the one or more full-sized OEM windows 125, as well as increase structural stability of the OEM extension 100.

In most embodiments, a full-sized OEM window 125 may be preinstalled in the OEM extension 100. In some embodiments, a user may remove the full-sized OEM window 125 from the vehicle 10 and may install the full-sized OEM window 125 into the OEM extension 100, thus saving on cost of additional windows. In most embodiments, the OEM extension 100 may be attached to an exterior body 12, a door 14, or a wall 20 of the vehicle 10.

In most embodiments, the extension 100 may be designed to fit outside the OEM window opening 110 of the vehicle 10, thus differing from the prior art extensions that are secured inside the OEM window opening 110. In most embodiments, the extension 100 may have a shape that may be integrated into the exterior body 12, the door 14, or the wall 20 of the vehicle 10.

Figure 5:
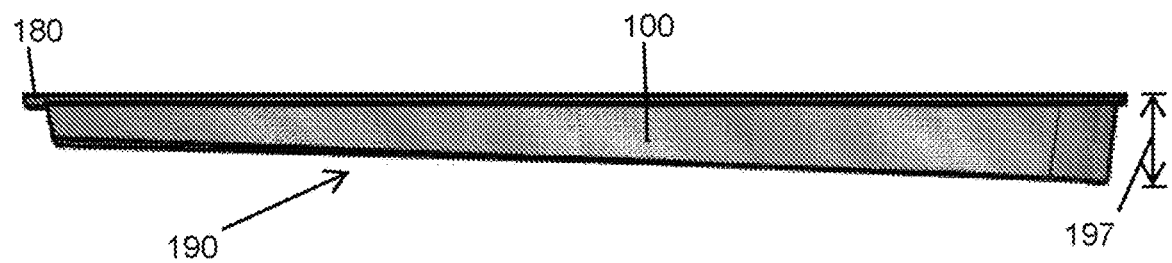
FIG. 5 is a top view of the OEM window wall extension.
Figure 6:
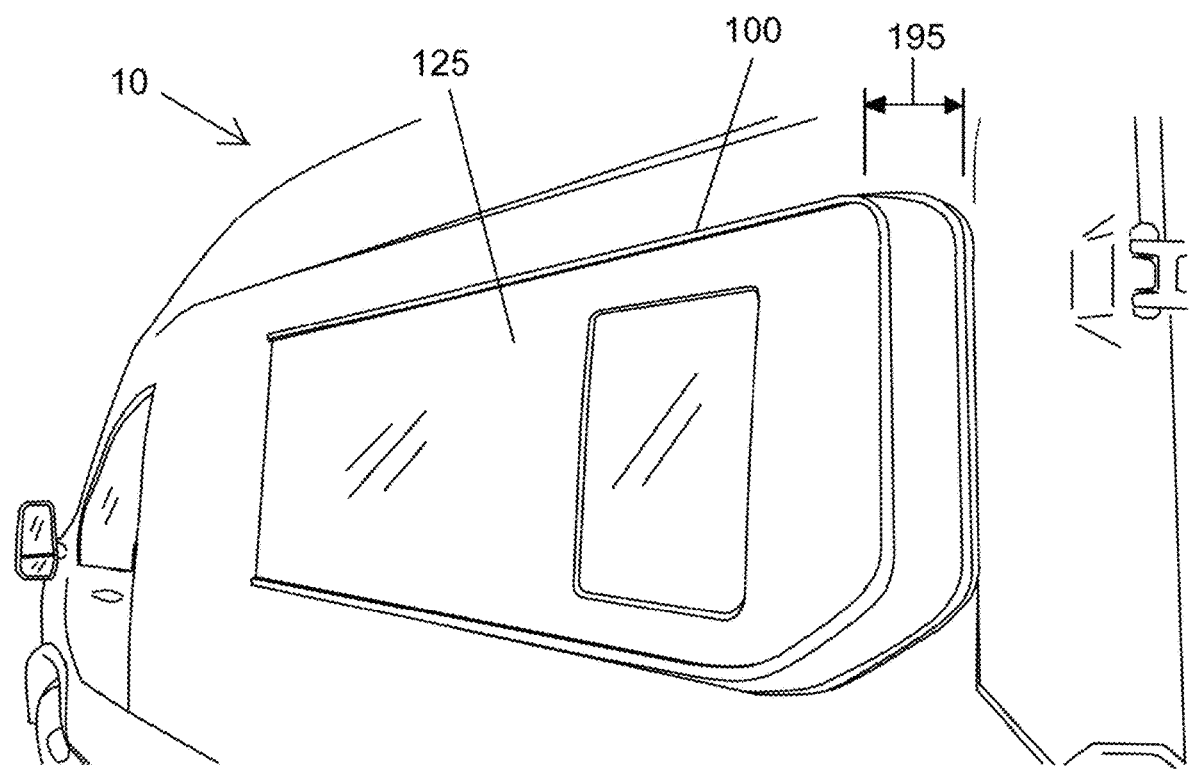
FIG. 6 is a perspective view of the OEM window wall extension on a vehicle.

In most embodiments, the OEM extension 100 may be designed with a slope 190, see FIG. 5, so as to promote drag forces against the OEM extension 100 and the vehicle 10. The slope 190 may also prevent the drag forces from removing the OEM extension 100 or the full-sized OEM windows 125 from the vehicle 10 when in motion. As seen in FIGS. 5 and 6, the OEM extension 100 may have a fixed depth 195 or a variable depth 197 (as best seen in FIG. 5) depending on the slope 190.

In most embodiments, the OEM extension 100 may be attached to the vehicle wall 20 of the vehicle 10 with at least one mechanical fasteners, adhesives, and friction fitting. In other embodiments, the OEM extension 100 may be attached to the vehicle wall 20 of the vehicle 10 with permanent fasteners, such as rivets, welding, and adhesives, or a combination of permanent and non-permanent fasteners, such as screws, bolts and nuts, etc. In some embodiments, the OEM extension 100 may be removable from the exterior body 12, the door 14, or the wall 20 of the vehicle 10 by using non-permanent fasteners.

In another embodiment, an original window 25 may be removable from a vehicle 10. The window 25 may have a rim 30 that may sit within the window opening 110 and may also be removed from the OEM window opening 110 of the vehicle 10. In most embodiments, an extension rim 130 may be installed in the OEM window opening 110. The extension rim 130 may have a flange protrusion 135 (not shown). In some embodiments, the flange protrusion 135 of the extension rim 130 may align with the flange protrusion 180 of the OEM extension 100. The flange protrusion 135 of the extension rim 130 and the flange protrusion 180 of the OEM extension 100 may be used for mounting and fastening the OEM extension 100 to the vehicle 10 using the fasteners described above. In most embodiments, the extension rim 130 may be removable from the OEM window opening 110. In most embodiments, the extension rim 130 may be installed with at least one mechanical fasteners, adhesives, and friction fitting. In some embodiments, the extension rim 130 may be integral with the exterior body 12, the door 14, or the wall 20 of the vehicle 10. In other embodiments, the extension rim 130 may be attached to the OEM window opening 110 with permanent fasteners, such as rivets, welding, and adhesives, or a combination of permanent and non-permanent fasteners.

In some embodiments, the extension 100 may slide into the extension rim 130. In other embodiments, the extension 100 may be installed into the extension rim 130 with at least one mechanical fasteners, adhesives, and friction fitting. In some embodiments, the extension 100 may be readily removable from the extension rim 130 via mechanical mechanisms such as clamps, bolts with wing-nuts, pushpin locking mechanisms, etc.

In some embodiments, the extension 100 may have a seal 102 (not shown) around a portion of the extension 100 adjacent to the vehicle 10 so as to prevent moisture from entering the vehicle 10. In some embodiments, the seal 102 may be around an entire perimeter of the extension 100. In most embodiments, the extension 100 may have a second seal 104 (no shown) around an entire perimeter of at least one the full-sized OEM windows 125 so as to prevent moisture from entering the vehicle 10. In most embodiments, the seal 102 and second seal 104 may be a permanent adhesive. In other embodiments, the seal 102 may be removable, such as a gasket, a flange, an O-ring, etc.

In some embodiments, the extension 100 may be expandable so as to further increase the interior of the vehicle 10. In some embodiments, the extension 100 may be expanded after installation within the extension rim 130. In a few embodiments, the extension 100 may be expandable using at least one of a mechanical means, hydraulic means, electrical means, and or electromagnetic means, such as a linear actuator, pistons, cranks, pop-out latches, etc.

In most embodiments, standard maintenance of the extension 100 may be completed with standard tools known by one reasonably skilled in the art. In some embodiments, the extension 100 may be made of one or more pieces 105, thus allowing the extension 100 to be taken apart for easy storage, cleaning, and shipping.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. An Original Equipment Manufacturer (OEM) window extension for a vehicle, the OEM window extension comprising:
   an extension, wherein the extension uses as least one extension fastener;
   an OEM window, wherein the OEM window is an original existing OEM window removed from the vehicle;
   wherein the extension is installed outside a perimeter of an existing window opening on the vehicle made by removing the original existing OEM window, wherein the extension is installed on an exterior of the vehicle; and
   wherein the OEM window is installed in the extension.

2. The OEM window extension of claim 1, wherein the extension has a flange protruding substantially around a perimeter of the extension; wherein the flange increases surface area of the extension that is affixed to the vehicle.

3. The OEM window extension of claim 1, wherein the extension has a ridge protruding away from the vehicle; wherein the ridge reduces water between the extension and the OEM window.

4. The OEM window extension of claim 1, wherein the extension has a slope that varies a depth of the extension.

5. The OEM window extension of claim 4, wherein the slope begins from the extension closest to a front of the vehicle and the slope of the extension extends away from the vehicle towards a rear of the vehicle, wherein the slope prevents damage to the extension as a result of drag forces on the extension.

6. The OEM window extension of claim 1, wherein the extension has a cross support bar; wherein the cross support bar is used to increase structural stability.

7. The OEM window extension of claim 1, wherein the extension holds more than one OEM window.

\* \* \* \* \*